United States Patent [19]

Tyre

[11] 3,739,300

[45] June 12, 1973

[54] SINGLE COMPONENT CONTROLLED RC BRIDGE

[76] Inventor: Roy W. Tyre, 3069 Margavera Terrace, Chamblee, Ga. 30341

[22] Filed: Mar. 7, 1972

[21] Appl. No.: 232,565

Related U.S. Application Data

[63] Continuation-in-part of Ser. No. 811,350, March 28, 1969.

[52] U.S. Cl. .............. 331/141, 331/140, 333/70 CR

[51] Int. Cl. .............. H03b 5/26

[58] Field of Search .............. 331/141, 140; 333/70 CR

[56] References Cited

UNITED STATES PATENTS

| | | | |
|---|---|---|---|
| 2,623,945 | 12/1952 | Wigan | 331/141 |
| 3,229,228 | 1/1966 | Reynolds | 331/141 |
| 3,308,400 | 3/1967 | Cochran | 331/141 |
| 3,611,194 | 10/1971 | Codd | 331/98 |

OTHER PUBLICATIONS

H. P. Hall, "Single-Component-Controlled RC Null Circuits" General Radio Experimenter Pages 8-10, July 1961.

Single-Control Element Wein Bridge R. Wigan, Electronic Technology, Pages 223-231, June 1960.

*Primary Examiner*—John Kominski

*Attorney*—John W. Malley, Paul N. Kokulis, Lawrence A. Hymo et al.

[57] ABSTRACT

A simple economical RC circuit having a single variable element and a transfer function which is of the same character as the well known Wien Bridge. The circuit comprises two legs: the first leg comprises a resistor and a capacitor in series with a resistor or a capacitor connected in parallel across them; the second leg comprises a resistor and capacitor in series, the resistor of the second leg being connected to the capacitor of the first leg when the parallel element of the first leg is a capacitor and vice versa. In one embodiment variable resistor connects between the midpoints of the two legs when the parallel element is a capacitor or a variable capacitor connects between the midpoints if the parallel element is a resistor. The circuit is useful as a replacement for the two adjacent frequency determining legs of a Wien Bridge, for example, in a bridge-controlled oscillator, the single variable resistor or capacitor determining the resonant frequency of the circuit and therefore the oscillation frequency. Further circuits derived by reciprocity are also disclosed.

6 Claims, 9 Drawing Figures

Fig. 3.
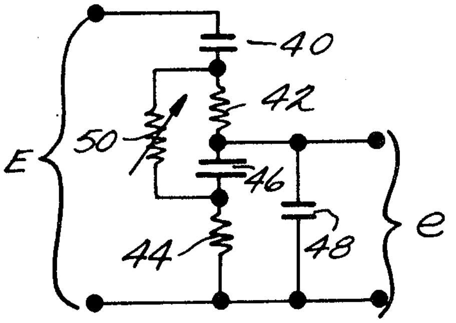
Fig. 4.
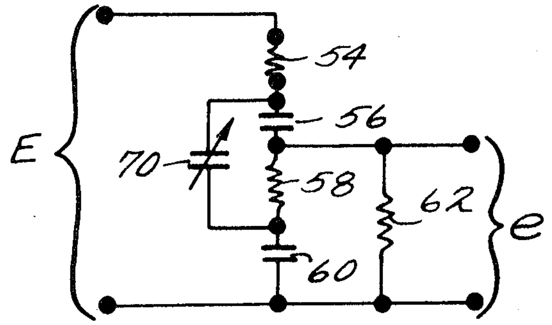
Fig. 1.
Fig. 2.
PRIOR ART
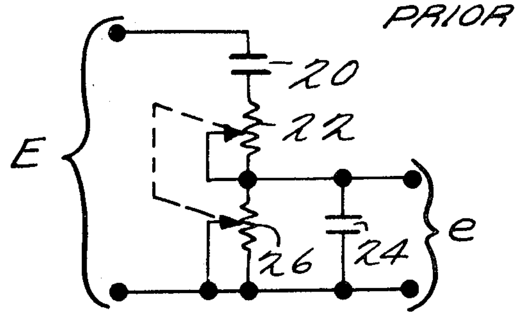
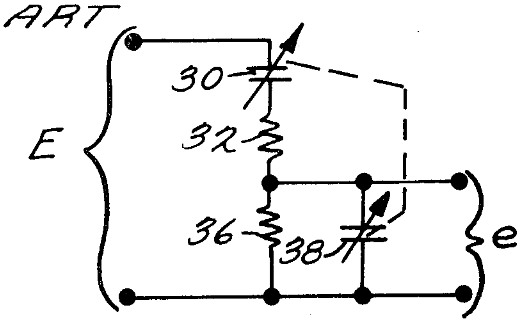
Fig. 5.
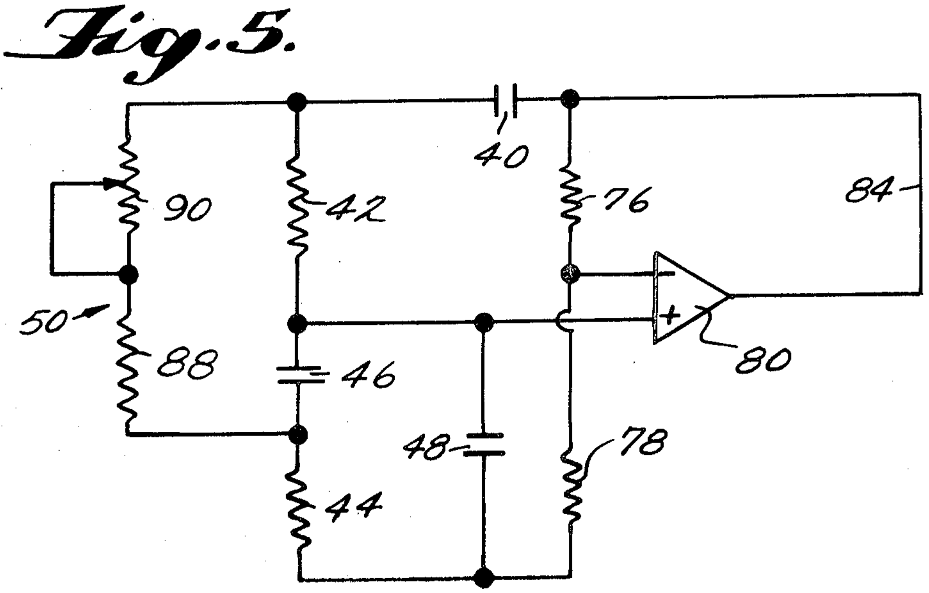

PATENTED JUN 12 1973

3,739,300

SHEET 2 OF 4

SINGLE COMPONENT CONTROLLED RC BRIDGE

This application is a continuation-in-part of Ser. No. 811,350, filed Mar. 28, 1969.

The invention relates to a simple economical, satisfactory, single component controlled RC circuit having a transfer function which is of the same character as that of the frequency determining legs of the well-known dual controlled Wien Bridge. More particularly, the novel network or circuit of this invention has in common with a Wien Bridge the following characteristics: an adjustable resonant frequency where transmission is maximum and phase shift is zero; a transmission ratio at the resonant frequency which is a constant value independent of the frequency adjustment; a frequency response of transmission magnitude which is geometrically symmetric about the resonant frequency (magnitude at frequency $kf_r$ = magnitude at frequency $fr/k$); and a frequency response of transmission phase shift which is geometrically antisymmetric about the resonant frequency (phase lag at frequency $kfr$= phase lead at frequency $fr/k$). Unlike the Wien Bridge it has a single variable element.

An electronic oscillator producing sinusoidal oscillations can be simply an electronic amplifier which is made to supply its own input. This self-supplying function can be accomplished in a variety of ways, but primarily it is accomplished by feeding a portion of the output of the amplifier back to the input via a feedback network which provides that the input and output signals at the oscillating frequency will be in phase.

One such feed-back network is called a Wien Bridge, which is a common designation for a bridge having four legs — usually two voltage dividing resistive legs, a third leg comprising a serially connected resistor and capacitor, and a fourth leg comprising a capacitor and resistor connected in parallel, and with the resistances or capacitances in the third and fourth legs ganged together. The use of this bridge in an oscillator was originally suggested by W. R. Hewlett and was described, in Oct., 1939 in an article entitled "Some Applications of Negative Feed-Back with Particular Reference to Laboratory Equipment" in the Proceedings of the I.R.E. Vol. 27, page 649.

The Wien Bridge oscillator, which still today is widely employed, particularly as a laboratory test oscillator at audio and lower radio frequencies, normally oscillates at a frequency such that the voltage across both of the capacitive-resistive legs is in the same phase as the voltage across one of them. Thus by connecting the input of the amplifier across one of the legs and a portion of the output across both, or vice versa, sinusoidal oscillations at that frequency are produced. The condition that the voltages are in phase, of course, occurs when the phase angles of the two resistive-capacitive impedances are the same. Further, if the values of the resistances and capacitances in the two legs are made the same, it is apparent that the oscillating frequency is simply equal to the inverse of the product of the values of resistance and capacitance.

Moreover, the frequency of a Wien Bridge oscillator can be simply changed by simultaneously varying in the same manner both of the capacitances or both of the resistances. This simultaneous variation can be conveniently accomplished by employing a ganged variable capacitor, or by varying simultaneously both of the resistances by means of two potentiometers suitably connected together or the like. Unlike most oscillators with resonant circuits, the resonant frequency of a Wien Bridge oscillator is inversely proportional to the product of capacitance and resistance rather than the square root of the product of capacitance and resistance, so that changes in the value of capacitance and resistance alter the oscillating frequency to a much greater extent than similar capacitance and resistance changes in a resonant circuit feed-back oscillator.

However, the Wien Bridge network for all its advantages has the singular disadvantage of requiring the use of ganged variable resistive or capacitive components which must be tracked closely to maintain stability when used in oscillator or other frequency selective circuits. This type of ganged circuit is more expensive and, of course, much more difficult to track than networks having a single variable component.

These drawbacks have been known for many years and much effort has been expended by numerous individuals in an attempt to find a single component controlled circuit which could replace the Wien Bridge. A paper by E. R. Wigan which appeared in Electronic Technology (British), June 1960, pp. 223–231 discusses a number of circuits of networks which purportedly can be used instead of the conventional Wien Bridge and at least some of which are also the subject of British Pat. 587,714 (1945). Wigan's networks are of two basic types, the first of which has a transfer function of the form:

$$e/E = sT_1 \;/\; (1 + s\,T_2 + s^2\,T_2^2),$$

where the time constants $T_i$ are complicated functions of the circuit element values. This transfer function is "Wienlike;" i.e., it, like the transfer-function of the Wien network, has the herein before-defined characteristics of symmetry, coincidence of maximum transmission and zero phase shift at a resonant frequency, and invariance of the resonant transmission ratio with tuning. However, this first type of circuit or network developed by Wigan has limited usefulness because the tuning range is quite restricted. This restriction apparently results from the relationship between $T_2$ and the circuit element values. Thus, a constant term not dependent upon the variable element sets a lower limit below which $T_2$ cannot be reduced, and this in turn sets an upper limit upon the resonant frequency.

To overcome this difficulty Wigan suggested adding a resistance (or other impedance in the derived networks), obtaining a second type of network which has a transfer function of the form:

$$e/E = sT_i\,(1 + s\,T_2) \;/\; (1 + s\,T_3 + s^2\,T_4^2),$$

where again the time constants $T_i$ are complicated functions of the circuit element values. The addition of the linear factor in the numerator makes possible a network in which both the frequency at which the phase shift is zero can be adjusted over a wide range by means of a single variable circuit element, and the attenuation at the frequency at which the phase shift is zero is a constant independent of the values of variable circuit elements. However, the additional factor is catastrophic to the "Wienlike" nature of the transfer function, as herein before defined, in that the transfer function no longer exhibits symmetry about the "resonant" frequency and, in fact, the frequency of maximum transmission is different from the frequency of zero phase shift. Moreover, the asymptotic transmission at high frequency is radically different from that of the Wien network or the network of this invention. While the network of this invention gives vanishingly small transmission and 90° phase shift, the second type of Wigan network transmission approaches a constant magnitude and zero degrees phase shift.

A number of other circuits are disclosed in an article entitled, "Single-Component-Controlled RC Null Circuits" which appeared in General Radio Experimenter, July 1961. Six of the networks shown are intended for use in conjunction with a fixed resistive divider to form a full bridge, in the manner in which the Wien network and the network of this invention are preferably used. Of these, FIGS. 8 and 9 show networks disclosed in the above mentioned Wigan article while FIGS. 10, 11, 12 and 13 show another network and its derivatives. These networks have the same properties as the aforementioned second type of Wigan network. For example, the network of FIG. 10, with $K=1$ and alpha=0.5 (the geometric center of its tuning range) has the transfer function:

$$e/E=(3/5)\ (1+s\ T)\ /\ (1+s\ 0.9T+s^2\ (T^2/10)\ ).$$

The phase slope at the operating frequency is very small, the maximum transmission occurs at a different frequency, and there is a high asymptotic transmission with zero phase shift at low frequencies. The networks of the aforementioned FIGS. 12 and 13 have a different transfer function in which the asymptotic problem occurs for high frequencies.

The novel circuit or network of this invention in contrast to the circuits of the prior art, has both single element control over a wide tuning range (theoretically infinite, with good phase slope maintained over a 10:1 or greater range) and a "Wienlike" transfer function.

The present invention thus provides a simple, economical, satisfactory, single component RC controlled bridge where transfer function is sufficiently "Wienlike," as hereinbefore defined, for it to replace the Wien Bridge and which, at the same time, incorporates substantially all of the other advantages of the Wien Bridge while substituting a single variable element for the ganged variable resistive and capacitive components. In addition, this circuit, as disclosed below, is sufficiently simple and and economical so as to be a practical replacement for a Wien Bridge. midpoints Briefly stated, one circuit of this invention comprises two legs: the first leg comprises a resistor and a capacitor in series with a resistor or a capacitor connected in parallel across them; the second leg comprises a resistor and capacitor in series, the resistor of the second leg being connected to the capacitor of the first leg when the parallel element of the first leg is a capacitor and vice versa. A variable resistor connects between the midpoints of the two legs when the parallel element is a capacitor or a variable capacitor connects between the midpoint if the parallel element is a resistor.

A further pair of circuits derived from the first circuits by reciprocity likewise is comprised of three capacitors and resistors interconnected together so as to provide the same network characteristics.

The circuit is useful as a replacement for the two adjacent frequency determining legs of a Wien Bridge, for [illegible]

frequency of the circuit and [illegible]

Other objects and purposes of the invention will become clear after reading the following detailed description of preferred embodiments, reference being made to the drawings, in which:

BRIEF DESCRIPTION OF THE DRAWINGS

FIG. 1 is a diagram of the resonant frequency controlling legs of a conventional Wien Bridge dual resistive controlled circuit;

FIG. 2 is a diagram of the corresponding legs of a conventional Wien Bridge dual capacitor controlled circuit;

FIG. 3 is a diagram of the single component resistive controlled embodiment of the circuit of the present invention;

FIG. 4 is a diagram of the single component capacitive controlled embodiment of the circuit of the present invention;

FIG. 5 is a diagram of an oscillator employing as its feed back network the novel circuit of this invention;

DETAILED DESCRIPTION OF THE DRAWINGS

Figure 6:
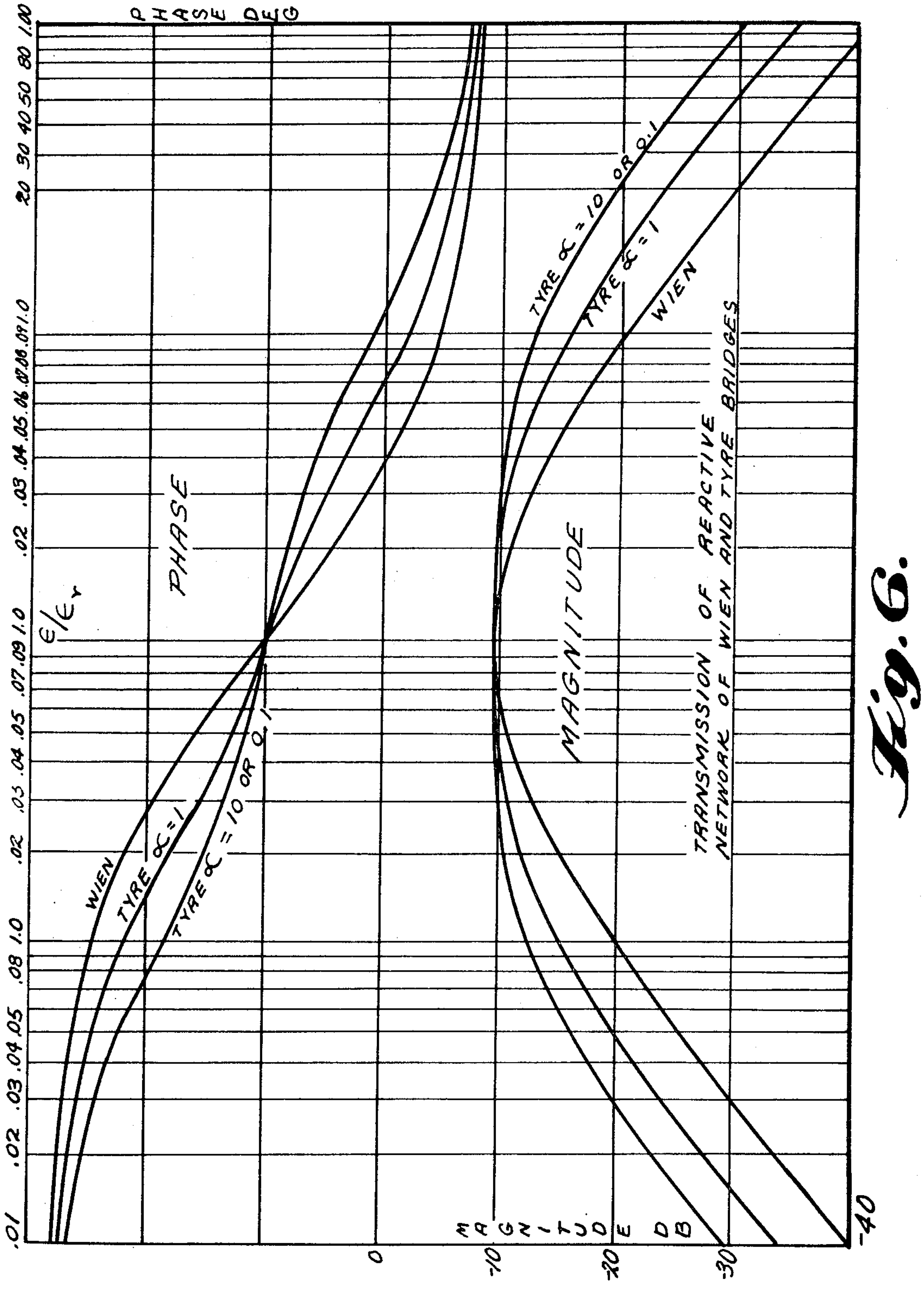
FIG. 6 is a semi logarithmic plot of the transfer functions of the frequency selective network portion of both the Wien Bridge and the bridge of this invention.

Reference is now made to FIG. 1 which shows the frequency controlling legs of a typical Wien Bridge circuit with an input e and an output E, or vice-versa. The circuit shown in FIG. 1 when used in a Wien Bridge oscillating system would, of course, conventionally make up but two adjacent legs of the bridge with two additional legs each made up of a single resistor and bridging the gap indicated by the voltage E. The first leg of the Wien Bridge shown in FIG. 1 is comprised of the capacitor 20 and the variable resistor 22, connected in series while the second parallel leg is made up of the capacitor 24 connected in parallel with the resistor 26. The resistors 22 and 26 are ganged together so that any change in resistance of one will cause substantially the same change in resistance of the other. Such resistive components must be tracked closely in order to maintain stability when used in oscillator or selective feedback amplifier circuits and such dual controlled elements make up the major expense of the circuit shown in FIG. 1.

Similarly, the circuit shown in FIG. 2 includes two legs of a Wien Bridge which is the dual analogue of the circuit shown in FIG. 1 with a first leg made up of capacitor 30 and resistor 32 connected in series and a second leg of resistor 36 and capacitor 38 connected in parallel. As in the embodiment shown in FIG. 1, the other two legs would conventionally, comprise single resistors connected across the voltage gap labelled E. As is apparent, the circuit in FIG. 2 differs from that of FIG. 1 in that the capacitors 30 and 38 are ganged together instead of the resistors as in FIG. 1. However, as [illegible]

30 and 38 vary the resonant frequency in the same manner.

For either of the conventional Wien Bridge circuits shown in FIG. 1 and 2 to be combined with some type of amplifier to make up an oscillator, it is necessary that some frequency exist at which the voltage $e$ will be in phase with voltage E and, of course, it is at this resonant frequency that the oscillations will be produced. The derivation of the transfer functions of the Wien Bridge circuits shown in FIG. 1 and 2 is elementary and will be omitted. However, the ratio of voltage e to voltage E can be simply shown to be:

$$e/E = (sRC) / (1 + 3sRC + s^2 (RC)^2)$$

where $R$ is the value of resistances 22 and 26 or resistances 32 and 36, $C$ is the value of capacitances 20 and 24 or capacitances 30 and 38 and S is $j\omega$ where $j$ is $\sqrt{-1}$ and $\omega$ equals $2\pi f$, $f$ being the frequency.

It is thus apparent from this transfer function that the input and output of this Wien Bridge will be in phase for an angular frequency ($\omega$) equal to $1/RC$. At this particular frequency, it is also apparent that the ratio of the amplitudes $e/E$ equals one-third and, of course, the phase angle between $e$ and $E$ at this frequency is equal to zero degrees. Thus, by varying either the resistance or capacitance value by means of the ganged resistances or capacitances, the frequencies of the sinusoidal oscillations produced can be rapidly and simply altered.

Reference is now made to FIG. 3 which shows one embodiment of the present invention having a single variable resistance element. While this circuit shown in FIG. 3 employs one more resistor and one more capacitor than the corresponding portion of the Wien Bridge circuit shown in FIGS. 1 and 2, variations in the oscillating frequency of any amplifier incorporating this circuit as a feed-back element can be accomplished simply by altering the value of a single resistor rather than two resistors as in the Wien Bridge. Thus, no unwieldy expensive and delicate ganged resistors, as heretofore required in the Wien Bridge circuit, are required.

The circuit shown in FIG. 3 is made up of two legs of a bridge circuit of which the other two legs are omitted. These other two legs can simply be two resistances serially connected across the gap labelled $E$. One of the legs of the bridge shown in FIG. 3 is made up of a capacitance 40 in series with a resistor 42. The other leg is comprised of a resistor 44 serially connected with a capacitor 46 and another capacitor 48 connected in parallel across both capacitor 46 and resistor 44. A variable resistor 50 is connected between the mid points of the two legs, and more particularly between the connection of resistor 42 and capacitor 40 and the connection of resistor 44 and capacitor 46 as indicated in FIG. 3. The value of the resistor 50 is variable and is a chosen proportion of the value of resistors 44 and 42 which are preferable. This proportion is expressed by the Greek letter alpha ($\alpha$).

The circuit shown in FIG. 4 is the dual analogue of the novel circuit shown in FIG. 3 and, of course, has the same transfer function and thus responds to signals in an identical manner.

This circuit can of course be readily derived from the first mathematically according to well established principles of network theory. Similarly, the third and fourth legs of the bridge circuit of FIG. 4 can be connected across the voltage gap labelled E in the same manner as indicated above. In the embodiment of FIG. 4, a first leg comprises the resistor 54 serially connected with a capacitor 56 and the second leg includes resistor 58 connected serially with capacitor 60 and a resistor 62 connected in parallel across both resistor 58 and capacitor 60. A variable capacitor 70 connects between the midpoints of the two legs in a manner analogous to the variable resistor in the embodiment of FIG. 3. The capacitor 70 has a capacitance which is a given proportion of the value of the capacitance of capacitors 56 and 60 and this proportion is indicated also by the Greek letter alpha ($\alpha$).

Surprisingly, instead of having a transfer function which is a cubic function of frequency because of the use of three capacitors, the transfer function of the circuit shown in FIGS. 3 and 4 is a square function of frequency and closely resembles the transfer function of the corresponding portion of the Wien Bridge. This square function is caused by cancellation of identical terms in the denominator and numerator of the transfer function, which then becomes:

$$e/E = (1 + \alpha)\, sRC / (1 + 3\,(1 + \alpha)sRC + s^2\alpha(RC)^2)$$

where $R$ is the value of each of the resistances 42 and 45 or each of the resistances 54, 58 and 62 and C is the value of each of the capacitances 40, 46 and 48 or each of the capacitances 56 and 60. It is apparent that at a resonant angular frequency ($\omega$) equal to $1/RC\ (1/\sqrt{\alpha})$, the input and output of the bridge will be in phase. It is further apparent that, at this resonant frequency, the ratio of $e/E$ is equal to one-third. Thus, the transfer function at the resonant frequency is identical to that in a conventional Wien Bridge and the novel circuit shown in FIGS. 3 and 4 can replace conventional Wien Bridge circuits without additional modifications in the amplifiers or other attendant circuitry.

Figure 7:
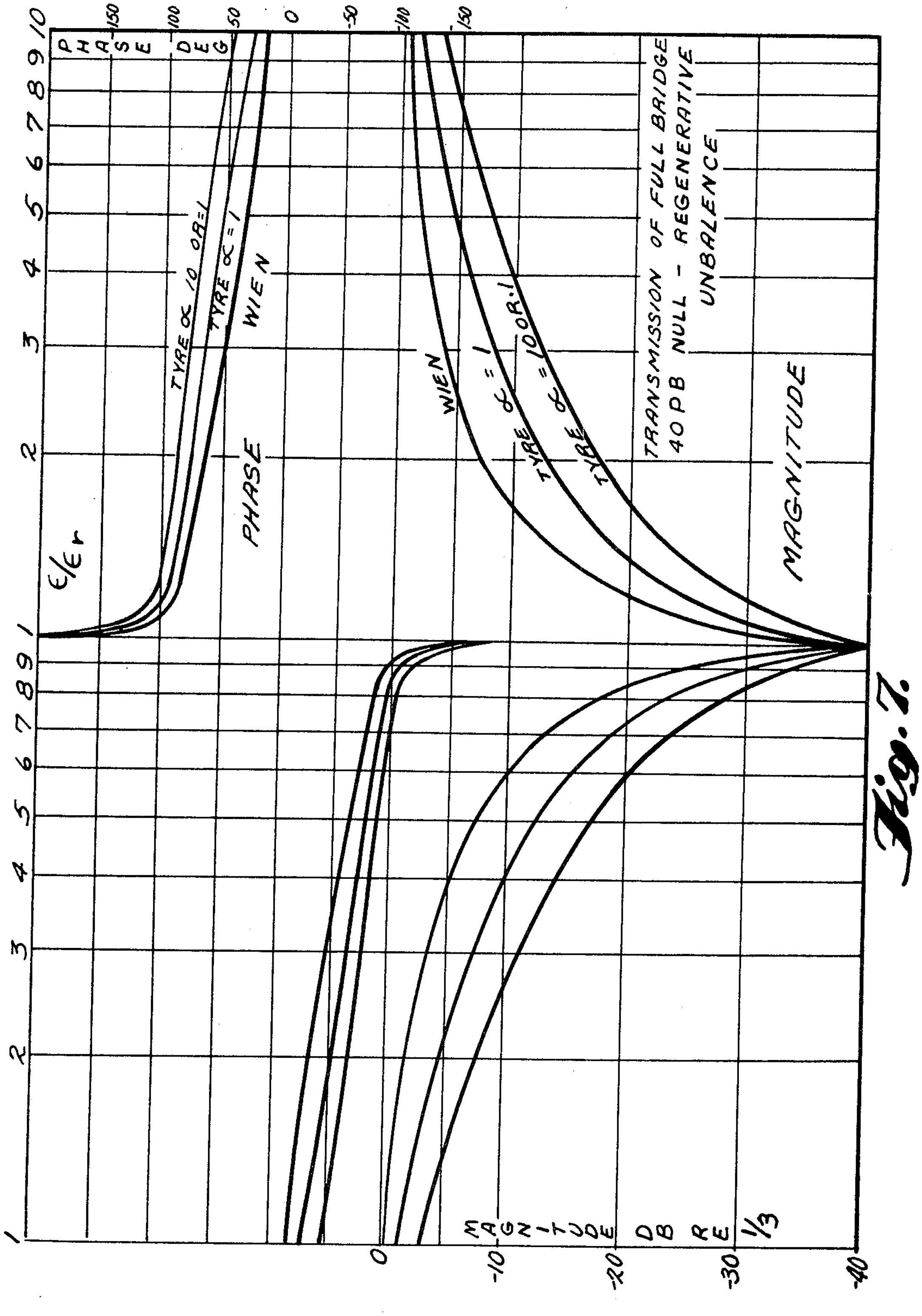
FIG. 7 is a semi logarithmic plot of the transfer functions of the Wien Bridge and the bridge of this invention.

Reference is now made to FIGS. 6 and 7 which show two transfer function plots which indicate the similarity of the Wien network and the network of this invention and which also illustrate how they differ. FIG. 6 shows a plot of the transfer function for the frequency-selective networks (half of the bridge) while FIG. 7 shows plots for the full bridges, unbalanced slightly to give a regenerative (with inverting amplifier) null 40db below the asymptotic ratio one-third. This is the condition that would normally be present in an oscillator with an inverting amplifier having an open-loop gain of 300. It will be noted that the Wien circuit and the circuit of this invention are most nearly identical for alpha=1. The circuit of this invention has a broader response than the Wien Bridge, the broadness increasing as alpha is varied above or below unity. (The plots are normalized in frequency scale, the center of the frequency scale representing the resonant frequency to which the network is adjusted.) The plots of FIGS. 6 and 7 exhibit another symmetry of the network of this invention, namely that the frequency-normalized transfer function for alpha=$1/k$ is identical to that for alpha=$k$. Also, it can be observed that frequency stability is impaired when alpha assumes extreme values. Thus, for optimum stability within a desired tuning range, alpha should preferably be unity at the geometric center of the tuning range (the frequency which is the geometric mean of the highest frequency and the lowest frequency to which the circuit is to be tuned by variation of alpha). A ten-to-one tuning ratio can then be obtained, for example, by varying alpha between 0.1 and 10.

Reference is now made to FIG. 5 which shows an operative oscillator incorporating the novel single component controlled bridge shown in FIG. 3. It should be apparent that the circuit of FIG. 4 as well as the circuits of FIGS. 8 and 9 could just as easily be incorporated in the same manner. In the oscillator shown in FIG. 5, a resistor 76 makes up the third leg of the bridge while the resistor 78 makes up the fourth leg and their serial connection bridges the gap labelled *E* in FIGS. 3 and 4. The point of connection between resistors 76 and 78 is also connected to the negative input of a conventional operational amplifier 80 while the output of the amplifier 80 on line 84 is fed back to the positive input of the amplifier 80 via one of the legs of the bridge and is operated on by the transfer function set forth above. In this embodiment, the variable resistance is altered by means of a fixed resistance 88 which may be of a small value and serially connected with a variable resistance 90 such as a potentiometer having a large range. This small resistance 88 sets the range of tuning control provided by the large resistor 90.

By way of illustration, a prototype of the circuit shown in FIG. 5 has been constructed with the following components:

| | | | |
|---|---|---|---|
| Resistor | 90 | 250 | Kiloohms |
| Resistor | 88 | 3.3 | Kiloohms |
| Resistor | 42 | 29.4 | Kiloohms |
| Resistor | 44 | 29.4 | Kiloohms |
| Resistor | 76 | 3.16 | Kiloohms |
| Resistor | 78 | 1.5 | Kiloohms |
| Capacitor | 46 | .005 | Microfarad |
| Capacitor | 48 | .005 | Microfarad |
| Capacitor | 40 | .005 | Microfarad |

This prototype has a given frequency range of 368 Hz to 3232 Hz with a 10V P–P sinusoidal output waveform. The high frequency limit was obtained by shorting out the resistor 90 while the low frequency limit was obtained by employing the full resistance of the resistor 90.

Figure 8:
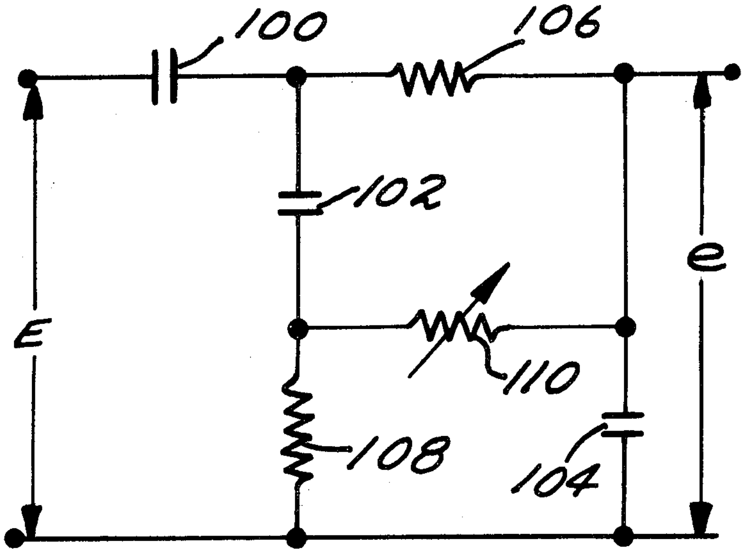
FIG. 8 is a further schematic showing another circuit of this invention derived by reciprocity.
Figure 9:
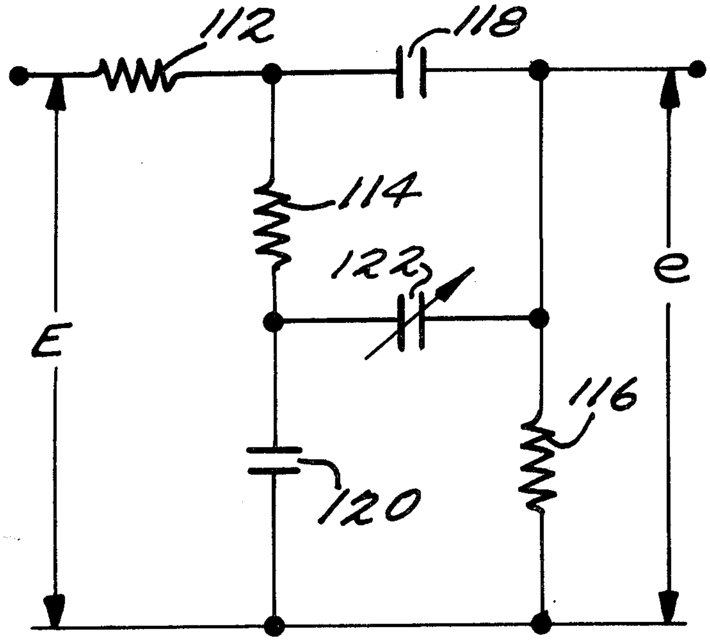
FIG. 9 is yet another schematic showing a circuit of this invention derived by reciprocity.

Reference is now made to FIGS. 8 and 9 which show further circuits derived from the circuits of FIGS. 3 and 4 by the reciprocity theorum. By conceptionalizing the output of the networks of FIGS. 3 and 4 to be the current through the output shunt component rather than the voltage across it, the reciprocity theorum can be directly applied. The circuits in FIGS. 8 and 9 are derived by changing the input series element to series and then interchanging input and output terminals.

The circuit in FIG. 8 includes first capacitor 100, second capacitor 102 and third capacitor 104, as well as first resistor 106, second resistor 108 and third resistor 110. All of the capacitors preferably have the same values as do the resistors 106 and 108. Resistor 110 is preferably variable and functions in the same manner as resistor 50 in FIG. 3 and capacitor 70 in FIG. 4. The input terminals to which an input voltage E is applied and the output terminals from which an output voltage *e* is derived are shown.

Similarly, the circuit in FIG. 9 includes first resistor 112, second resistor 114 and third resistor 116, as well as first capacitor 118, second capacitor 120, and third capacitor 122. All the resistors preferably have the The single component controlled circuit thus incorporates advantages not present in the corresponding portion of a conventional Wien Bridge while at the same time retaining substantially all of the unique advantages of the Wien Bridge circuit which has made it widely known and used. Moreover, the substitution of a single control component for the usual dual component of the Wien Bridge still results in acceptable circuit stability, although, since the circuit of this invention is slightly inferior to the Wien circuit in sharpness of response which is related to frequency stability, the stability is somewhat inferior to the Wien Bridge. For most applications this slight inferiority will be of no concern. Further, it is thought that the more simplified construction of this invention will somewhat improve stability over what would be otherwise expected because of the elimination of the problem of tracking the ganged resistors and capacitors. Further, the single controlled component lends itself more readily to miniaturization because the single element tuner allows a wider selection of physical properties and dimensions. Also, an integrated circuit approach is both more practical and economical with this new circuit since only the single variable resistor or capacitor must be excluded from the integrated portion and because of the similar transfer function and response of the Wien Bridge and this circuit, the novel circuit of this invention can be used as a direct replacement for dual component Wien Bridges without extensive alteration of either the attendant circuits or amplifiers.

However, it is the inherent simplicity and economy of this circuit which makes it a particularly attractive and practical replacement for the Wien Bridge.

While the improved circuit of this invention finds especial utility in a feed-back element, it can be used in place of a Wien Bridge in many other environments, such as in a selective amplifier. Moreover, while preferred embodiments and circuit parameters have been given above by way of illustration, it will be recognized that no limitation thereto is intended; many variations and modifications are possible without departing from the scope of this invention.

What is claimed is:

1. In an electronic oscillator comprising an amplifier and a frequency selective feedback network returning a part of the output of said amplifier to its input; the improvement wherein said feedback network includes a variable frequency selective circuit comprising;

a first capacitor having a first terminal and a second terminal, a first resistor having a first terminal and a second terminal and having said first terminal of said first resistor electrically connected to said second terminal of said first capacitor, a second capacitor having a first terminal and a second terminal and having said first terminal of said second capacitor electrically connected to said second terminal of said first resistor, a second resistor having a first terminal and a second terminal and having said first terminal of said second resistor electrically connected to the second terminal of said second capacitor, a third capacitor having a first terminal and a second said second terminal of said third capacitor electrically connected to said second terminal of said second resistor, a third resistor having a first terminal and a second terminal having said first terminal of said third resistor electrically connected to the junction of said second terminal of said first capacitor and said first terminal of said first resistor, and having said second terminal of said third resistor electrically connected to the junction of said second terminal of said second capacitor and said first terminal of said second resistor, means connected to said first terminal of said first capacitor and to the junction of said second terminal of said second resistor and said second terminal of said third capacitor for providing a first pair of signal terminals, and means connected to the junction of said first terminal of said third capacitor, the first terminal of said second capacitor and the second terminal of said first resistor and to the junction of said second terminal of said second resistor and said second terminal of said third capacitor for providing a second pair of signal terminals.

2. In an oscillator as in claim 1, wherein all capacitors in said circuit are of the same value and wherein said first resistor has the same value as said second resistor.

3. An oscillator as in claim 1, which further includes a fourth resistor having a first terminal connected to said second terminal of said second resistor and a fifth resistor having a first terminal connected to said first terminal of said first capacitor, the fourth and fifth resistors each having a second terminal and said second terminals of said fourth and fifth resistors being connected to each other.

4. A variable frequency selective circuit comprising:

a first capacitor having a first terminal and a second terminal, a first resistor having a first terminal and a second terminal and having said first terminal of said first resistor electrically connected to said second terminal of said first capacitor, a second capacitor having a first terminal and a second terminal and having said first terminal of said second capacitor electrically connected to said second terminal of said first resistor, a second resistor having a first terminal and a second terminal and having said first terminal of said second resistor electrically connected to the second terminal of said second capacitor, a third capacitor having a first terminal and a second terminal, having said first terminal of said third capacitor electrically connected to the junction of said second terminal of said first resistor and said first terminal of said second capacitor, and having said second terminal of said third capacitor electrically connected to said second terminal of said second resistor, a third resistor having a first terminal and a second terminal having said first terminal of said third resistor electrically connected to the junction of said second terminal of said first capacitor and said first terminal of said first resistor, and having said second terminal of said third resistor electrically connected to the junction of said second terminal of said second capacitor and said first terminal of said second resistor, means connected to said first terminal of said first capacitor and to the junction of said second terminal of said second resistor and said second terminal of said third capacitor for providing a first pair of signal terminals, and means connected to the junction of said first terminal of said third capacitor, the first terminal of said second capacitor and the second terminal of said first resistor and to the junction of said second terminal of said second resistor and said second terminal of said third capacitor for providing a second pair of signal terminals.

5. A circuit as in claim 7, wherein said third resistor is variable.

6. A circuit as in claim 7, wherein said first capacitor, said second capacitor and said third capacitor have the substantially same value and wherein said first resistor and said second resistor have substantially the same value.

* * * * *